United States Patent
Nakamoto et al.

(10) Patent No.: US 9,954,246 B2
(45) Date of Patent: Apr. 24, 2018

(54) LIQUID ELECTROLYTE FOR LITHIUM BATTERY AND LITHIUM BATTERY

(71) Applicants: TOYOTA JIDOSHA KABUSHIKI KAISHA, Toyota-shi, Aichi-ken (JP); KYOTO UNIVERSITY, Kyoto-shi, Kyoto-fu (JP)

(72) Inventors: Hirofumi Nakamoto, Kyoto (JP); Zempachi Ogumi, Kyoto (JP); Takeshi Abe, Takatsuki (JP)

(73) Assignees: TOYOTA JIDOSHA KABUSHIKI KAISHA, Toyota (JP); KYOTO UNIVERSITY, Kyoto (JP)

( * ) Notice: Subject to any disclaimer, the term of this patent is extended or adjusted under 35 U.S.C. 154(b) by 158 days.

(21) Appl. No.: 14/949,026

(22) Filed: Nov. 23, 2015

(65) Prior Publication Data
US 2016/0204471 A1     Jul. 14, 2016

(30) Foreign Application Priority Data
Jan. 9, 2015  (JP) .................................. 2015-003213

(51) Int. Cl.
*H01M 10/052*    (2010.01)
*H01M 10/0567*   (2010.01)
(Continued)

(52) U.S. Cl.
CPC ..... *H01M 10/052* (2013.01); *H01M 10/0567* (2013.01); *H01M 10/0568* (2013.01);
(Continued)

(58) Field of Classification Search
None
See application file for complete search history.

(56) References Cited

U.S. PATENT DOCUMENTS

| 6,489,055 B1 | 12/2002 | Ichihashi et al. |
| 2009/0286163 A1 | 11/2009 | Shin et al. |
| 2016/0087308 A1 | 3/2016 | Nakamoto et al. |

FOREIGN PATENT DOCUMENTS

| CN | 105449280 A | 3/2016 |
| EP | 0938151 A2 | 8/1999 |

(Continued)

OTHER PUBLICATIONS

McOwen et al., "Concentrated Electrolytes: Decrypting Electrolyte Properties and Reassessing Al Corrosion Mechanisms," Energy & Environmental Science, vol. 7, pp. 416-426, 2014.
(Continued)

*Primary Examiner* — Sarah A. Slifka
(74) *Attorney, Agent, or Firm* — Oliff PLC (57) ABSTRACT

An object of the present invention is to provide a liquid electrolyte for a lithium battery in which lowering of reactivity of a Li ion and an electrode active material due to a glyme is suppressed. In the present invention, the above object is achieved by providing a liquid electrolyte for a lithium battery comprising: a glyme represented by general formula: $R^1$—$O(CH_2CH_2O)_n$—$R^2$ (in which $R^1$ and $R^2$ each independently represent an alkyl group with 4 or less carbon atoms or a fluoroalkyl group with 4 or less carbon atoms, and n is in the range of 2 to 10); a Li amide salt having a Li ion and a sulfonylamide anion; and a fluoride salt represented by XF (in which X represents Li, Na, K, Rb, or Cs).

11 Claims, 6 Drawing Sheets

(51) Int. Cl.
*H01M 10/0568* (2010.01)
*H01M 10/0569* (2010.01)
*H01M 10/054* (2010.01)

(52) U.S. Cl.
CPC ...... *H01M 10/0569* (2013.01); *H01M 10/054* (2013.01); *H01M 2300/0025* (2013.01); *H01M 2300/0034* (2013.01); *Y02T 10/7011* (2013.01)

(56) References Cited

FOREIGN PATENT DOCUMENTS

| EP | 2999044 A1 | 3/2016 |
|----|------------|--------|
| JP | 2001-068154 A | 3/2001 |
| JP | 2010073489 A | 4/2010 |
| JP | 2014007117 A | 1/2014 |

OTHER PUBLICATIONS

Unemoto et al., "Development of All-Solid-State Lithium Ion Battery Using Quasi-solidified Tetraglyme-Lithium Bis(Trifluoromethanesulfonly)Amide-Fumed Silica Nano-Composites as Electrolytes," Journal of Power Sources, vol. 244, pp. 354-362, 2013.

TFSA ANION

FIG. 2B

FSA ANION

LIQUID ELECTROLYTE FOR LITHIUM BATTERY AND LITHIUM BATTERY

TECHNICAL FIELD

The present invention relates to a liquid electrolyte for a lithium battery in which lowering of reactivity of a Li ion and an electrode active material due to a glyme is suppressed.

BACKGROUND ART

In recent years, with rapid spread of information-related equipment such as personal computers, video cameras, and mobile phones, batteries used as a power source therefor have been actively developed. Further, in the automobile industry, development of batteries having high output and high capacity for electric vehicles or hybrid vehicles has been promoted. Among various batteries, a lithium battery has an advantage of a high energy density.

In this regard, as a solvent of a liquid electrolyte for a lithium battery, it is known to use a glyme that is one of oligoethers. For example, Patent Literature 1 discloses a Li-based secondary battery which includes a cathode containing a specific electrode active material, a liquid electrolyte in which at least a part of a glyme and a Li salt forms a complex, and an anode. This technique is intended to improve rate characteristics and a power density of a battery. In addition, Patent Literature 2 discloses a liquid electrolyte which contains only a glyme as a solvent of the liquid electrolyte and an alkali metal salt as a solute of the liquid electrolyte, in which at least a part of the glyme and the alkali metal salt forms a complex. This technique is intended to provide a high-voltage liquid electrolyte having high thermal stability and being usable in general in-vehicle secondary batteries.

CITATION LIST

Patent Literature

Patent Literature 1: Japanese Patent Application Laid-Open No. 2014-007117
Patent Literature 2: Japanese Patent Application Laid-Open No. 2010-073489

SUMMARY OF INVENTION

Technical Problem

The glyme has advantages of high thermal stability and chemical stability; on the other hand, the glyme forms a stable complex together with a Li salt (Li ions) as described in Patent Literatures 1 and 2. Specifically, a glyme having a chain structure is coordinated so as to surround (wrap) Li ions, thereby forming a stable complex. As a result, the reactivity of Li ions is lowered and thus a problem arises in which the Li ions are difficult to react with an electrode active material.

The present invention is achieved under the above-described circumstances, and a main object of the present invention is to provide a liquid electrolyte for a lithium battery in which lowering of reactivity of a Li ion and an electrode active material due to a glyme is suppressed.

Solution to Problem

In order to achieve the above object, the present invention is to provide a liquid electrolyte for a lithium battery comprising: a glyme represented by general formula: $R^1$—O$(CH_2CH_2O)_n$—$R^2$ (in which $R^1$ and $R^2$ each independently represent an alkyl group with 4 or less carbon atoms or a fluoroalkyl group with 4 or less carbon atoms, and n is in the range of 2 to 10), a Li amide salt having a Li ion and a sulfonylamide anion, and a fluoride salt represented by XF (in which X represents Li, Na, K, Rb, or Cs).

According to the present invention, when a fluoride salt is added to a glyme and a Li amide salt, it is possible to obtain a liquid electrolyte for a lithium battery in which lowering of reactivity of a Li ion and an electrode active material due to a glyme is suppressed. The reaction resistance of the Li ion and the electrode active material can be lowered, and for example, the charge-discharge properties of the lithium battery can be improved. Specifically, the charge and discharge speed can be improved and thus charging and discharging can be performed at a higher rate.

In the above-described invention, it is preferable that the glyme be a tetraglyme.

In the above-described invention, it is preferable that the fluoride salt be LiF.

Further, in the present invention, there is provided a lithium battery comprising a cathode active material layer, an anode active material layer, and an electrolyte layer formed between the cathode active material layer and the anode active material layer, in which the electrolyte layer contains the above-described liquid electrolyte for a lithium battery.

According to the present invention, when the above-described liquid electrolyte for a lithium battery is used, it is possible to obtain a lithium battery having favorable rate characteristics.

Advantageous Effects of Invention

The liquid electrolyte for a lithium battery of the present invention exhibits an effect capable of suppressing lowering of reactivity of a Li ion and an electrode active material due to a glyme.

DESCRIPTION OF EMBODIMENTS

Hereinafter, a liquid electrolyte for a lithium battery and a lithium battery of the present invention will be described in detail.

A. Liquid Electrolyte for Lithium Battery

The liquid electrolyte for a lithium battery of the present invention comprises a glyme represented by general formula: $R^1$—$O(CH_2CH_2O)_n$—$R^2$ (in which $R^1$ and $R^2$ each independently represent an alkyl group with 4 or less carbon atoms or a fluoroalkyl group with 4 or less carbon atoms, and n is in the range of 2 to 10), a Li amide salt having a Li ion and a sulfonylamide anion, and a fluoride salt represented by XF (in which X represents Li, Na, K, Rb, or Cs).

According to the present invention, when a fluoride salt is added to a glyme and a Li amide salt, it is possible to obtain a liquid electrolyte for a lithium battery in which lowering of reactivity of a Li ion and an electrode active material due to a glyme is suppressed. As a result, the reaction resistance of the Li ion and the electrode active material can be lowered, and for example, the charge and discharge characteristics of the lithium battery can be improved. Specifically, the charge and discharge speed can be improved and thus charging and discharging can be performed at a higher rate.

Here, the reason why the reaction resistance of the Li ion and the electrode active material due to the glyme can be lowered is speculated as follows. That is, as described above, since the glyme is coordinated to Li ions to form a stable complex, the reactivity of the Li ion is lowered. On the other hand, the fluoride salt interacts with the complex and thus the stability of the complex is lowered. As a result, the reactivity of the Li ion is improved and thus it is speculated that the Li ion is likely to react with the electrode active material.

Further, it can be expected that the glyme has high chemical stability with respect to a fluoride ion because of the chemical structure of the glyme. On the other hand, the fluoride salt has an extremely strong ion binding property. Since an ether group included in the glyme does not have an enough electron-donating property to dissociate the ion bond of the fluoride salt, the fluoride salt is insoluble in the glyme. In this regard, when the Li amide salt is used together with the fluoride salt and the glyme, the fluoride salt can be dissolved in the glyme. The reason for this is speculated that, when the glyme is solvated with the Li amide salt, the glyme is likely to be interacted with the fluoride ion and the dissociation of ions of the fluoride salt can be accelerated. In this way, in order to dissolve the fluoride salt in the glyme, the Li amide salt is necessarily present, and it can be said that the effect of the present invention is an effect which can be obtained in such a manner that the glyme, the Li amide salt, and the fluoride salt integrally and organically bonded to each other. Incidentally, in the liquid electrolyte for a lithium battery of the present invention, it is preferable that the fluoride salt be completely dissolved, but at least a part of the fluoride salt may be dissolved.

Hereinafter, each constitution of the liquid electrolyte for a lithium battery of the present invention will be described.

1. Glyme

The glyme in the present invention is a compound represented by general formula: $R^1$—$O(CH_2CH_2O)_n$—$R^2$ (in which $R^1$ and $R^2$ each independently represent an alkyl group with 4 or less carbon atoms or a fluoroalkyl group with 4 or less carbon atoms, and n is in the range of 2 to 10).

In the above-described general formula, $R^1$ and $R^2$ may be same or different from each other. Further, the number of carbon atoms in $R^1$ or $R^2$ is generally 4 or less, and may be any of 4, 3, 2, and 1. When the number of carbon atoms in $R^1$ or $R^2$ is too large, the interaction with the Li ion and the fluoride ion may be sterically inhibited. Specific examples of the alkyl group with 4 or less carbon atoms include a methyl group, an ethyl group, a propyl group, an isopropyl group, a butyl group, a sec-butyl group, an isobutyl group, and a tert-butyl group. In addition, a fluoroalkyl group is a group in which a part or whole of hydrogen of the alkyl group is substituted with fluorine.

In the above-described general formula, "n" is generally in the range of 2 to 10. "n" may be 3 or more. When "n" is too small, a Li ion may become a fluoride salt in the presence of a fluoride ion. On the other hand, "n" may be 8 or less, or may be 5 or less. When "n" is too large, the interaction between glymes becomes strong and thus solvation with the Li ion may be less likely to occur. In the present invention, one kind of the glyme represented by the above-described general formula may be used alone or two or more thereof may be used in combination.

Further, examples of the glyme in the present invention may include diethylene glycol diethyl ether (G2), triethylene glycol dimethyl ether (G3), tetraethylene glycol dimethyl ether (G4), diethylene glycol dibutyl ether, diethylene glycol methylethyl ether, triethylene glycol methylethyl ether, and triethylene glycol butylmethyl ether.

2. Li Amide Salt

The Li amide salt in the present invention has a Li ion and a sulfonylamide anion.

The sulfonylamide anion is an anion in which N (anion center) in the amide anion and S of the sulfonyl group are bonded to each other. The sulfonylamide anion may have one or two sulfonyl groups. It is preferable that the sulfonyl group be bonded to an alkyl group (for example, 4 or less carbon atoms), a fluoroalkyl group (for example, 4 or less carbon atoms), or fluorine. Examples of the sulfonylamide anion may include bisfluorosulfonylamide (FSA) anion and bistrifluoromethane sulfonylamide (TFSA) anion. Further, the sulfonylamide anion may be a symmetrical sulfonylamide anion in which two functional groups bonded to N (anion center) are the same.

3. Fluoride Salt

The fluoride salt in the present invention is a compound represented by XF (in which X represents Li, Na, K, Rb, or Cs). X is preferably Li or Na, and is more preferably Li. In the present invention, one kind of the fluoride salt described above may be used alone or two or more thereof may be used in combination.

4. Liquid Electrolyte for Lithium Battery

The liquid electrolyte for a lithium battery of the present invention generally comprises the above-described glyme as a solvent. The solvent of the liquid electrolyte for a lithium battery may be only the glyme represented by the above-described general formula or may be a mixture of the glyme represented by the above-described general formula and other solvent. The ratio of the glyme relative to the whole solvent is, for example, 10 mol % or more, preferably 30 mol % or more, more preferably 50 mol % or more, even more preferably 70 mol % or more, and particularly preferably 90 mol % or more.

As for the other solvent, an ionic liquid and a non-aqueous solvent can be exemplified. The ionic liquid indicates a material with a melting point of 100° C. or lower. In particular, the melting point of the ionic liquid is preferably 50° C. or lower, and more preferably 25° C. or lower.

Examples of the cation of an ionic liquid may include a piperidinium skeleton cation, a pyrrolidinium skeleton cation, an imidazolium skeleton cation, an ammonium cation, and a phosphonium cation.

Examples of the anion of an ionic liquid may include an amide anion represented by bisfluorosulfonylamide (FSA) anion and bistrifluoromethane sulfonylamide (TFSA) anion, a phosphate anion represented by hexafluorophosphate anion and tris(pentafluoroethyl)trifluorophosphate anion, a tetrafluoroborate (TFB) anion, and a triflate anion.

The kind of the non-aqueous solvent is not particularly limited, and examples thereof may include ethylene carbonate (EC), fluoroethylene carbonate (FEC), difluoroethylene carbonate (DFEC), propylene carbonate (PC), dimethyl carbonate (DMC), diethyl carbonate (DEC), ethyl methyl carbonate (EMC), butylene carbonate (BC), γ-butyrolactone, sulfolane, acetonitrile, 1,2-dimethoxymethane, 1,3-dimethoxypropane, diethyl ether, tetrahydrofuran, 2-methyltetrahydrofuran, dimethyl sulfoxide (DMSO), and a mixture of any of them.

The concentration of the Li amide salt in the liquid electrolyte for a lithium battery is not particularly limited, and for example, is 0.5 mol/L or more, preferably 1.5 mol/L or more, and more preferably 2.5 mol/L or more. On the other hand, the concentration of the Li amide salt is, for example, 8 mol/L or less, and preferably 6 mol/L or less.

The concentration of the fluoride salt in the liquid electrolyte for a lithium battery is not particularly limited, and for example, is 0.1 mol/L or more, preferably 0.2 mol/L or more, and more preferably 0.3 mol/L or more. On the other hand, the concentration of the fluoride salt is, for example, 6 mol/L or less, and preferably 3 mol/L or less.

The mole ratio (B/R) of the fluoride salt (B) to the Li amide salt (A) is, for example, in the range of 0.02 to 1.5, and preferably in the range of 0.05 to 1.

B. Lithium Battery

Figure 1:
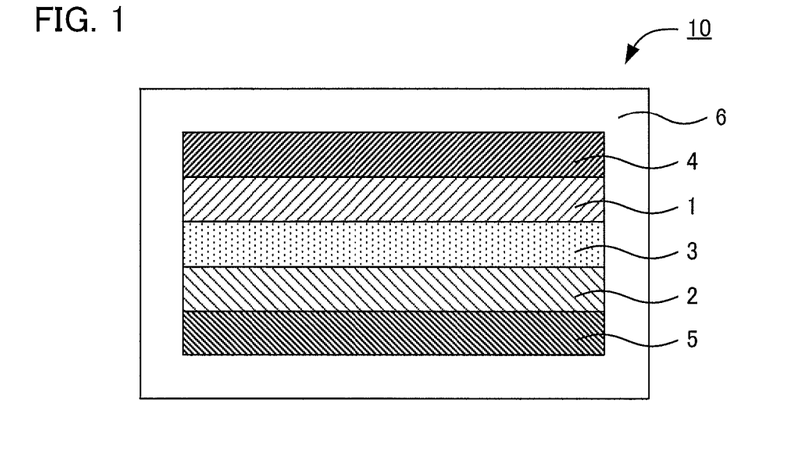
FIG. 1 is a schematic sectional view illustrating an exemplary lithium battery of the present invention.
Figure 2A:
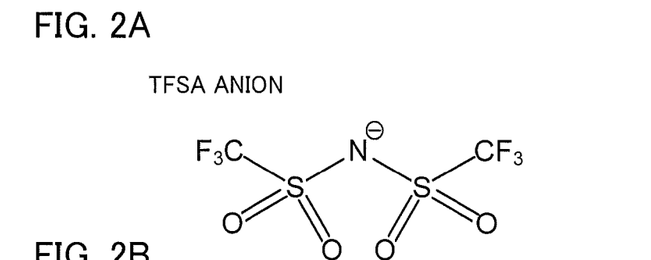
FIGS. 2A to 2D show chemical formulas describing compounds used in Examples 1 to 6 and Comparative Example 1.
Figure 2B:
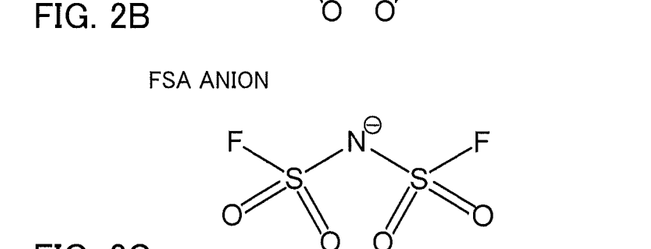
Figure 2C:
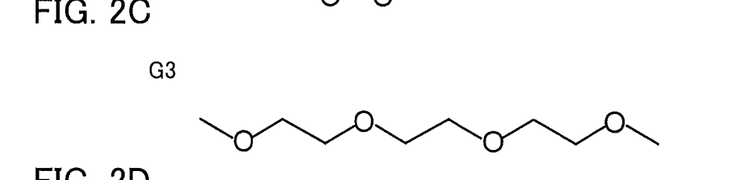
Figure 2D:
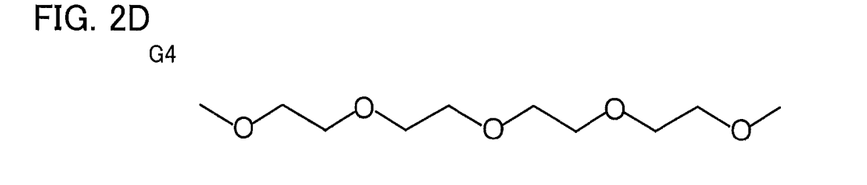

FIG. 1 is a schematic sectional view illustrating an exemplary lithium battery of the present invention. A lithium battery 10 illustrated in FIG. 1 comprises a cathode active material layer 1, an anode active material layer 2, an electrolyte layer 3 formed between the cathode active material layer 1 and the anode active material layer 2, a cathode current collector 4 for collecting current by the cathode active material layer 1, an anode current collector 5 for collecting current by the anode active material layer 2, and a battery case 6 for accommodating these members. Further, the electrolyte layer 3 contains the liquid electrolyte described in "R. Liquid Electrolyte for Lithium Battery" which is described above.

According to the present invention, when the above-described liquid electrolyte for a lithium battery is used, it is possible to obtain a lithium battery having favorable rate characteristics.

Hereinafter, each constitution of the lithium battery of the present invention will be described.

1. Electrolyte Layer

The electrolyte layer in the present invention is a layer which is formed between the cathode active material layer and the anode active material layer. In the present invention, the electrolyte layer contains the above-described liquid electrolyte for a lithium battery. The thickness of the electrolyte layer varies greatly depending on the constitution of a battery, and is not particularly limited.

2. Cathode Active Material Layer

The cathode active material layer in the present invention is a layer which contains at least a cathode active material. Further, the cathode active material layer may further contain at least one of a conductive material and a binder, in addition to a cathode active material.

The kind of the cathode active material is not particularly limited, and, for example, an oxide active material can be exemplified. Examples of the oxide active material may include rock salt bed type active materials such as $LiCoO_2$, $LiMnO_2$, $LiNiO_2$, $LiVO_2$, and $LiNi_{1/3}Co_{1/3}Mn_{1/3}O_2$, spinel type active materials such as $LiMn_2O_4$ and $Li(Ni_{0.5}Mn_{1.5})O_4$, and olivine type active materials such as $LiFePO_4$, $LiMnPO_4$, $LiNiPO_4$, and $LiCuPO_4$.

The conductive material is not particularly limited as long as it has desired electron conduction, and, for example, a carbon material can be exemplified. Examples of the carbon material may include carbon black such as acetylene black, ketjen black, furnace black, or thermal black. Meanwhile, the binder is not particularly limited as long as it is chemically and electrically stable. Examples thereof may include a fluorine-based binder such as polyvinylidene fluoride (PVDF) or polytetrafluoroethylene (PTFE). Further, higher content of the cathode active material in the cathode active material layer is preferred from the viewpoint of capacity. Furthermore, the thickness of the cathode active material layer varies greatly depending on the constitution of a battery, and is not particularly limited.

3. Anode Active Material Layer

The anode active material layer in the present invention is a layer which contains at least an anode active material. Further, the anode active material layer may further contain at least one of a conductive material and a binder, in addition to an anode active material.

The kind of the anode active material is not particularly limited, and examples thereof may include a metal active material and a carbon active material. Examples of the metal active material may include an elemental metal, an alloy, and a metal oxide. Examples of the metal element included in the metal active material may include Al, Mg, In, Si, and Sn. Examples of the carbon active material may include mesocarbon microbeads (MCMB), high orientation property graphite (HOPG), hard carbon, and soft carbon.

The same conductive material and binder as materials described in the above-described cathode active material layer can be also used. Further, higher content of the anode active material in the anode active material layer is preferred from the viewpoint of capacity. Further, the thickness of the anode active material layer varies greatly depending on the constitution of a battery, and is not particularly limited.

4. Other Constitutions

The lithium battery of the present invention comprises at least the cathode active material layer, the anode active material layer, and the electrolyte layer that are described above. Further, the lithium battery generally comprises a cathode current collector for collecting current by the cathode active material layer and an anode current collector for collecting current by the anode active material layer. Examples of a material of the cathode current collector may include SUS, aluminum, nickel, iron, titanium, and carbon. Meanwhile, examples of a material of the anode current collector may include SUS, copper, nickel, and carbon. Furthermore, any general materials may be used as a material of the battery case, and, for example, SUS or the like can be exemplified.

5. Lithium Battery

The lithium battery of the present invention may be a primary battery or a secondary battery. In particular, a secondary battery is preferable since the secondary battery can be repeatedly charged and discharged and is useful as, for example, a battery mounted on a vehicle. Examples of the shape of the lithium battery of the present invention may include a coin shape, a laminate shape, a barrel shape, and a square shape.

Incidentally, the present invention is not limited to the embodiments described above. The above embodiments are merely an exemplification and any of those having substantially the same constitution as the technical spirit described in Claims of the present invention and exhibiting the same working effects as those is included in the technical scope of the present invention.

EXAMPLES

Hereinafter, the present invention will be described in more detail by means of Examples.

Example 1

Lithium bistrifluoromethane sulfonylamide (Li-TFSA, manufactured by Kishida Chemical Co., Ltd.) and cesium fluoride (CsF, manufactured by KANTO CHEMICAL CO., INC.) were mixed in a tetraglyme (G4, tetraethylene glycol dimethyl ether, manufactured by Kishida Chemical Co., Ltd.) such that molar concentrations of Li-TFSA and CsF became 4.5 mol/L and 4.6 mol/L, respectively. After that, the resultant mixture was stirred under conditions including 60° C. for 70 hours or longer within a sealed container made of a fluororesin, thereby obtaining a liquid electrolyte for evaluation.

Example 2

Lithium bistrifluoromethane sulfonylamide (Li-TFSA, manufactured by Kishida Chemical Co., Ltd.) and cesium fluoride (CsF, manufactured by KANTO CHEMICAL CO., INC.) were mixed in a triglyme (03, triethylene glycol dimethyl ether, manufactured by Kishida Chemical Co., Ltd.) such that molar concentrations of Li-TFSA and CsF became 5.5 mol/L and 5.5 mol/L, respectively. After that, the resultant mixture was stirred under conditions including 60° C. for 70 hours or longer within a sealed container made of a fluororesin, thereby obtaining a liquid electrolyte for evaluation.

Example 3

Lithium bisfluorosulfonylamide (Li-FSA, manufactured by Kishida Chemical Co., Ltd.) and cesium fluoride (CsF, manufactured by KANTO CHEMICAL CO., INC.) were mixed in a tetraglyme (G4, tetraethylene glycol dimethyl ether, manufactured by Kishida Chemical Co., Ltd.) such that molar concentrations of Li-FSA and CsF became 4.5 mol/L and 0.45 mol/L, respectively. After that, the resultant mixture was stirred under conditions including 60° C. for 70 hours or longer within a sealed container made of a fluororesin, thereby obtaining a liquid electrolyte for evaluation.

Example 4

Lithium bisfluorosulfonylamide (Li-FSA, manufactured by Kishida Chemical Co., Ltd.) and cesium fluoride (CsF, manufactured by KANTO CHEMICAL CO., INC.) were mixed in a triglyme (G3, triethylene glycol dimethyl ether, manufactured by Kishida Chemical Co., Ltd.) such that molar concentrations of Li-FSA and CsF became 5.5 mol/L and 0.55 mol/L, respectively. After that, the resultant mixture was stirred under conditions including 60° C. for 70 hours or longer within a sealed container made of a fluororesin, thereby obtaining a liquid electrolyte for evaluation.

Example 5

A liquid electrolyte for evaluation was obtained in the same manner as in Example 2, except that lithium fluoride (LiF, manufactured by Wako Pure Chemical Industries, Ltd.) was used instead of CsF.

Example 6

A liquid electrolyte for evaluation was obtained in the same manner as in Example 2, except that sodium fluoride (NaF, manufactured by Aldrich) was used instead of CsF.

Comparative Example 1

A liquid electrolyte for evaluation was obtained in the same manner as in Example 1, except that CsF was not used. Further, FIGS. 2A to 2D show chemical formulas describing compounds used in Examples 1 to 6 and Comparative Example 1. The liquid electrolyte for evaluation obtained in each of Examples 1, 2, 5 and 6 was a liquid electrolyte in which the fluoride salt was dissolved in a saturated concentration. Therefore, in these liquid electrolytes, part of the fluoride was undissolved and remained as residual because of chemical equilibrium influence.

TABLE 1

|  | Glyme | Li amide salt | Fluoride salt |
| --- | --- | --- | --- |
| Example 1 | G4 | Li-TFSA (4.5 mol/L) | CsF (4.6 mol/L) |
| Example 2 | G3 | Li-TFSA (5.5 mol/L) | CsF (5.5 mol/L) |
| Example 3 | G4 | Li-FSA (4.5 mol/L) | CsF (0.45 mol/L) |
| Example 4 | G3 | Li-FSA (5.5 mol/L) | CsF (0.55 mol/L) |
| Example 5 | G3 | Li-TFSA (5.5 mol/L) | LiF (5.5 mol/L) |
| Example 6 | G3 | Li-TFSA (5.5 mol/L) | NaF (5.5 mol/L) |
| Comparative Example 1 | G4 | Li-TFSA (4.5 mol/L) | — |

[Evaluation]
(Measurement of Cyclic Voltammetry)

CV measurement was performed for the liquid electrolyte for evaluation obtained in each of Examples 1 to 6 and Comparative Example 1. Specifically, the evaluation was conducted by using a dip type three-electrode cell in a glove box under Ar atmosphere. For an acting electrode, an Al plate or an Mg plate was used. For a counter electrode, a composite electrode composed of PTFE, acetylene black (AB), and fluorinated carbon was used. Incidentally, the composite electrode is an electrode with a weight ratio of PTFE:AB:fluorinated carbon=1:2:7. Further, by using vycor glass, a standard electrode was separated from the liquid electrolyte for evaluation. Incidentally, as for the standard electrode, Ag wire immersed in an acetonitrile solution, in which each of silver nitrate and tetrabutyl ammonium perchlorate is dissolved at a concentration of 0.1 M, was used. Furthermore, the measurement was performed under conditions including room temperature and a sweep rate of 1 mV/s.

Figure 3A:
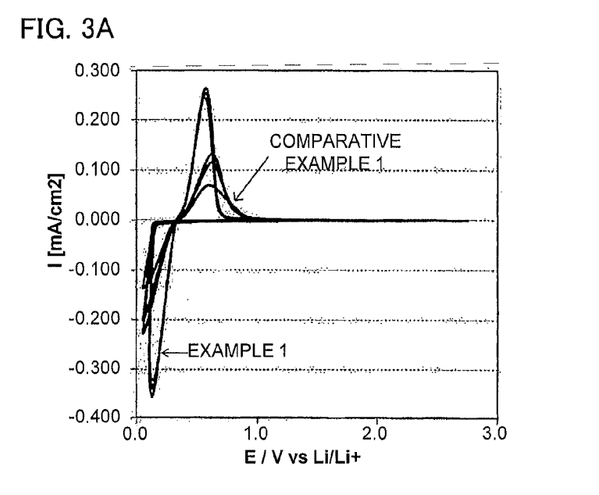
FIGS. 3A to 3C show the result of CV measurement (using an Al plate) of the liquid electrolyte for evaluation obtained in each of Example 1 and Comparative Example 1.
Figure 3B:
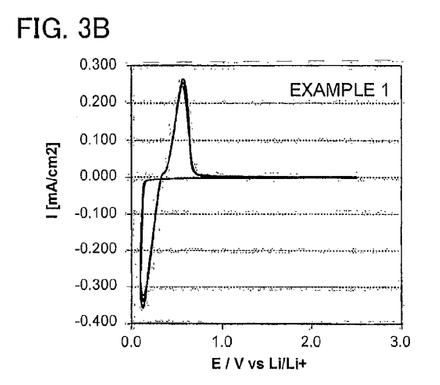
Figure 3C:
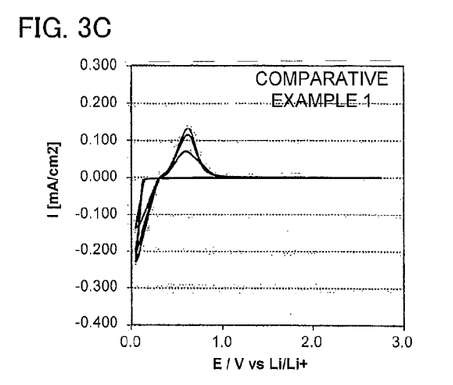

First, FIG. 3A shows the result of CV measurement (using an Al plate) of the liquid electrolyte for evaluation obtained in each of Example 1 and Comparative Example 1, and FIGS. 3B and 3C show each result separately. As shown in FIGS. 3A to 3C, in both of Example 1 and Comparative Example 1, a reduction current peak accompanied with alloying of Li with Al was determined around 0.1 V and an oxidation current peak accompanied with dealloying of Li from a LiAl alloy was determined around 0.6 V.

Further, the electric quantity of the alloying of Li (the electric quantity of the reduction current) and the electric quantity of the dealloying of Li (the electric quantity of the oxidation current) in Example 1 were larger than those in Comparative Example 1. That is, the reaction amount of Al was large. In this way, it could be confirmed that the reaction resistance of the Li ion and the electrode active material can be lowered when the fluoride salt was added to the glyme and the Li amide salt. From this result, it was suggested that the charge and discharge speed was improved. It was suggested that this liquid electrolyte for evaluation showed promise as the liquid electrolyte for a lithium battery. In particular, when Al is used as an anode active material, a potential at which the alloying of Li is generated is relatively high and thus there is an advantage that precipitation of the Li metal can be suppressed. Further, Al has an advantage that the capacity per weight and the capacity per volume are about two times those of the carbon active material.

Figure 4A:
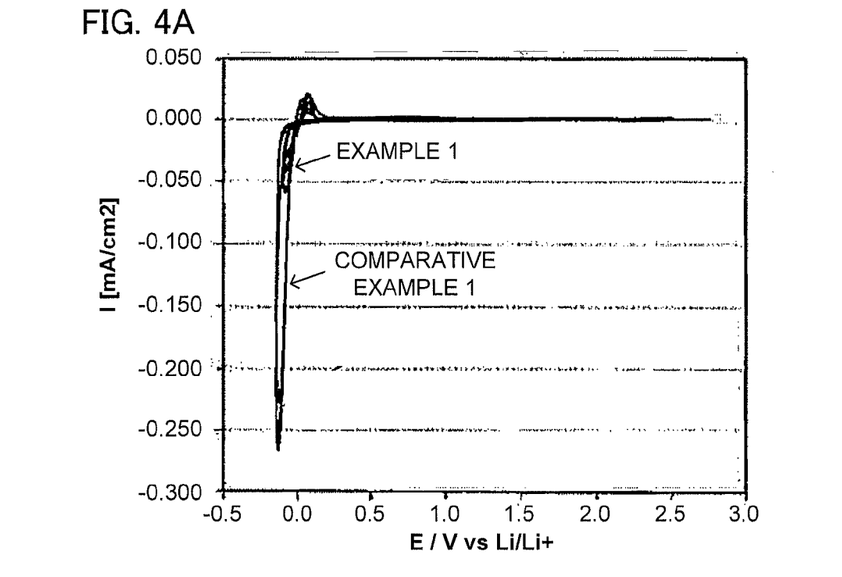
FIGS. 4A and 4B show the result of CV measurement (using an Mg plate) of the liquid electrolyte for evaluation obtained in each of Example 1 and Comparative Example 1.
Figure 4B:
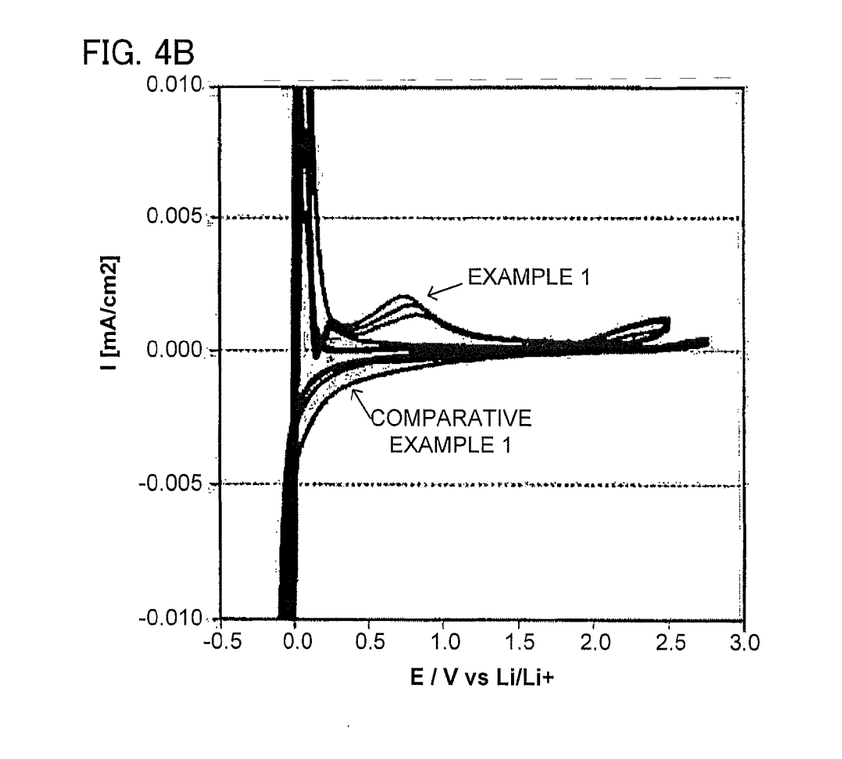
Figure 5A:
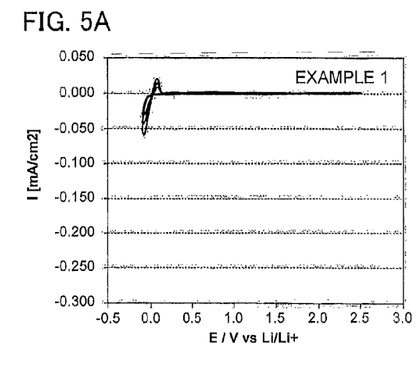
FIGS. 5A and 5B show the result of CV measurement (using an Mg plate) of the liquid electrolyte for evaluation obtained in each of Example 1 and Comparative Example 1.
Figure 5B:
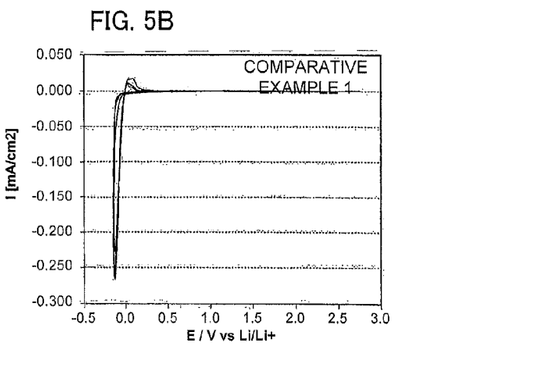

Further, FIGS. 4 and 5 show the result of CV measurement (using an Mg plate) of the liquid electrolyte for evaluation obtained in each of Example 1 and Comparative Example 1. Incidentally, FIG. 4B is an enlarged view of FIG. 4A, and FIGS. 5A and 5B show each result separately. As shown in FIG. 4B, in Example 1, an oxidation current peak accompanied with dealloying of Li from a LiMg alloy was determined around 0.7 V. Meanwhile, this peak was not determined in Comparative Example 1. Incidentally, a reduction current peak accompanied with alloying of Li with Mg could not be determined since the alloying of Li with Mg proceeds in cooperation with Li precipitation at 0 V. Furthermore, as shown in FIGS. 5A and 5B, the electric quantities of the dealloying of Li (the electric quantity of the oxidation current) in Example 1 and Comparative Example 1 were at almost the same, but the electric quantity of the alloying of Li (the electric quantity of the reduction current) in Example 1 was smaller than that in Comparative Example 1. Therefore, as compared to Comparative Example 1, it was suggested that Example 1 has high reversibility (Coulomb efficiency) of the alloying of Li and it was suggested that Example 1 is excellent in cycle stability.

Figure 6A:
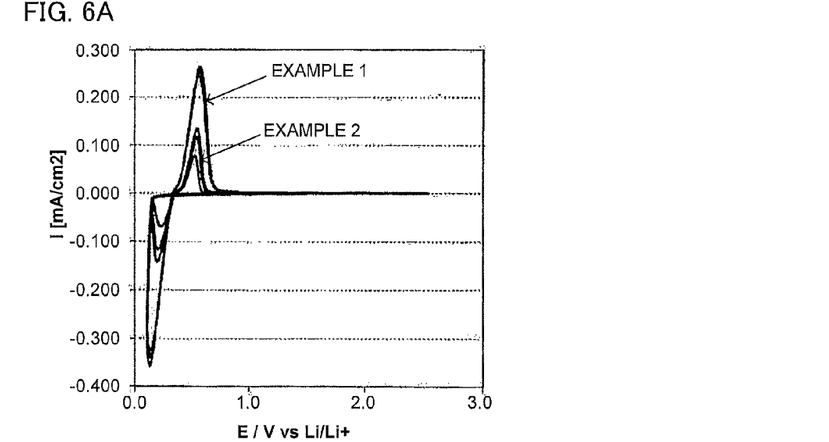
FIGS. 6A to 6C show the result of CV measurement (using an Al plate) of the liquid electrolyte for evaluation obtained in each of Examples 1 and 2.
Figure 6B:
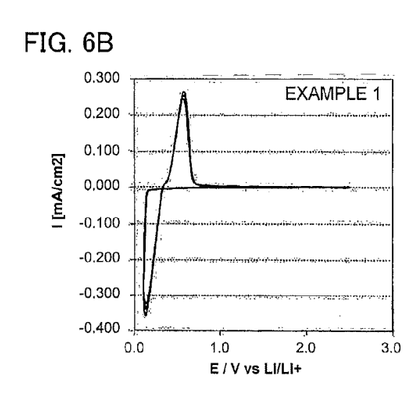
Figure 6C:
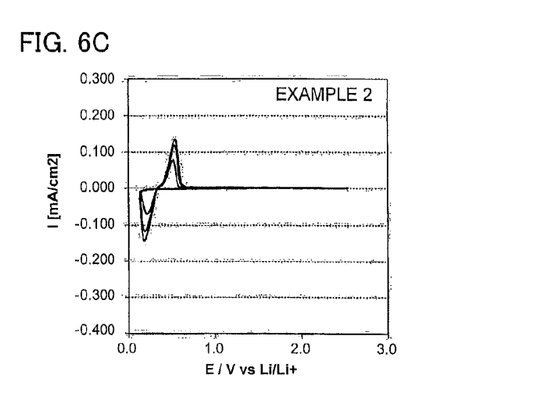
Figure 7A:
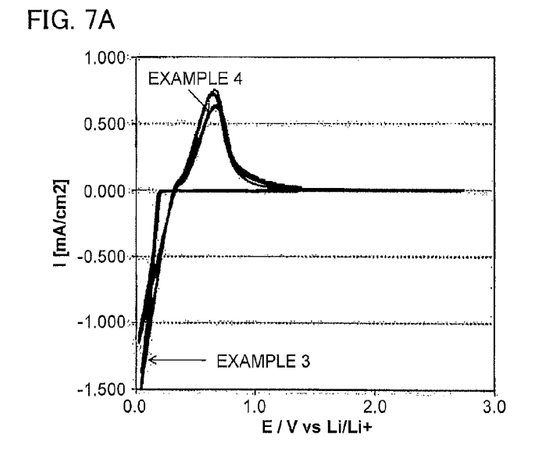
FIGS. 7A to 7C show the result of CV measurement (using an Al plate) of the liquid electrolyte for evaluation obtained in each of Examples 3 and 4.
Figure 7B:
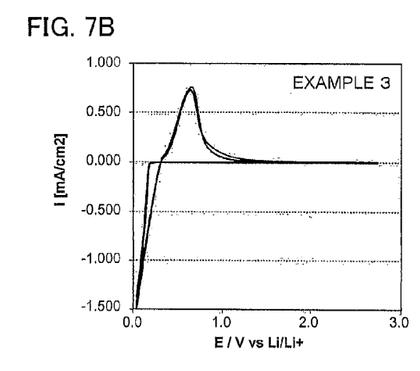
Figure 7C:
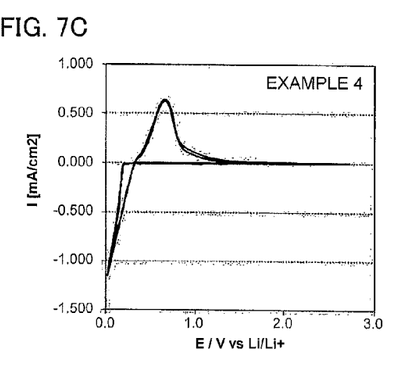

Next, FIG. 6A shows the result of CV measurement (using an Al plate) of the liquid electrolyte for evaluation obtained in each of Examples 1 and 2, and FIGS. 6B and 6C show each result separately. Further, FIG. 7A shows the result of CV measurement (using an Al plate) of the liquid electrolyte for evaluation obtained in each of Examples 3 and 4, and FIGS. 7B and 7C show each result separately. As shown in FIGS. 6 and 7, in all Examples 1 to 4, a reduction current peak accompanied with alloying of Li with Al was determined around 0.1 V, and an oxidation current peak accompanied with dealloying of Li from a LiAl alloy was determined around 0.6 V.

Further, the electric quantity of the alloying of Li (the electric quantity of the reduction current) and the electric quantity of the dealloying of Li (the electric quantity of the oxidation current) in Example 1 were larger than those in Example 2. Similarly, the electric quantity of the alloying of Li (the electric quantity of the reduction current) and the electric quantity of the dealloying of Li (the electric quantity of the oxidation current) in Example 3 were larger than those in Example 4. In this way, it could be confirmed that the reaction resistance of the Li ion and the electrode active material can be lowered in the case of using a liquid electrolyte for evaluation containing a tetraglyme, as compared to the case of using a liquid electrolyte for evaluation containing a triglyme. Incidentally, since a triglyme has lower viscosity than a tetraglyme, the resistance relative to the liquid electrolyte is low. Regardless of this, in the case of using a tetraglyme, more satisfactory results were obtained. The reason for this is speculated that the length of the chain structure of a tetraglyme is suitable for the interaction between the Li ion and the fluoride ion.

Figure 8A:
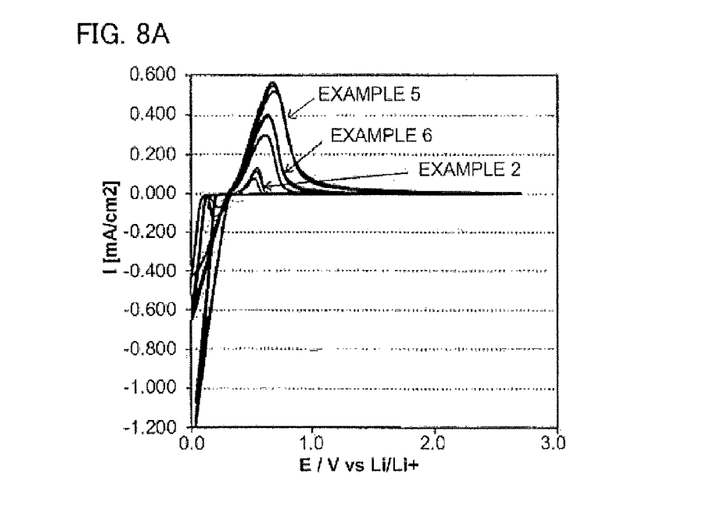
FIGS. 8A to 8C show the result of CV measurement (using an Al plate) of the liquid electrolyte for evaluation obtained in each of Examples 2, 5, and 6.
Figure 8B:
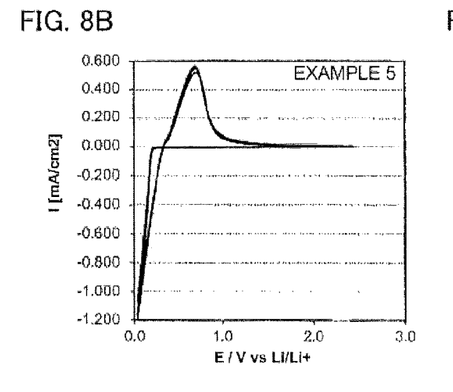
Figure 8C:
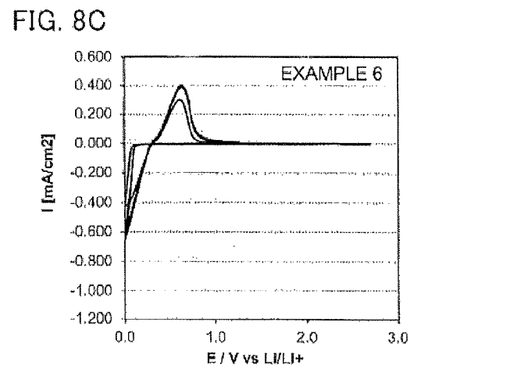

Next, FIG. 8A shows the result of CV measurement (using an Al plate) of the liquid electrolyte for evaluation obtained in each of Examples 2, 5, and 6, and FIGS. 8B and 8C show each result of Examples 5 and 6 separately. Incidentally, since the result of Example 2 is the same as in FIG. 6C, the description thereof is omitted. As shown in FIGS. 8A to 8C, in all Examples 2, 5, and 6, a reduction current peak accompanied with alloying of Li with Al was determined around 0.1 V and an oxidation current peak accompanied with dealloying of Li from a LiAl alloy was determined around 0.6 V. Furthermore, the electric quantities of the alloying of Li (the electric quantity of the reduction current) and the electric quantities of the dealloying of Li (the electric quantity of the oxidation current) in Examples 5 and 6 were larger than those in Example 2. In this way, it could be confirmed that the reaction resistance of the Li ion and the electrode active material can be lowered in the case of using a liquid electrolyte for evaluation containing LiF or NaF, as compared to the case of using a liquid electrolyte for evaluation containing CsF. In particular, since the molecular size of LiF is small, LiF is likely to approach the Li ion included the complex, and the stability of the complex is likely to be lowered. Furthermore, also when the Li ion and LiF interact with each other, de-fluorination of LiF does not proceed apparently. Therefore, an unstable state where the Li ions receive interaction from both the glyme and the LiF is created and thus it is speculated that the Li ions are likely to move (improve the reactivity of the Li ions). Furthermore, since the onset potential of the alloying of Li (reduction onset potential) in Example 5 is at the side of the noble potential (+) as compared to Examples 2 and 6, the effect of reducing the overvoltage during the charging can be expected.

REFERENCE SIGNS LIST 1 cathode active material layer
2 anode active material layer
3 electrolyte layer
4 cathode current collector
5 anode current collector
6 battery case
10 lithium battery

What is claimed is:
1. A liquid electrolyte for a lithium battery comprising:
a glyme represented by general formula:

where $R^1$ and $R^2$ each independently represent an alkyl group with 4 or less carbon atoms or a fluoroalkyl group with 4 or less carbon atoms, and n is in the range of 2 to 10;
a Li amide salt having a Li ion and a sulfonylamide anion; and
a fluoride salt represented by XF, where X represents Li, Na, K, Rb, or Cs.

2. The liquid electrolyte for a lithium battery according to claim 1, wherein the glyme is a tetraglyme.

3. The liquid electrolyte for a lithium battery according to claim 1, wherein the fluoride salt is LiF.

4. A lithium battery comprising a cathode active material layer, an anode active material layer, and an electrolyte layer formed between the cathode active material layer and the anode active material layer, wherein the electrolyte layer contains the liquid electrolyte for a lithium battery according to claim 1.

5. The liquid electrolyte for a lithium battery according to claim 1, wherein the fluoride salt represented by XF, where X represents Na, K, Rb, or Cs.

6. The liquid electrolyte for a lithium battery according to claim 5, wherein the glyme is a tetraglyme.

7. A lithium battery comprising a cathode active material layer, an anode active material layer, and an electrolyte layer formed between the cathode active material layer and the anode active material layer, wherein the electrolyte layer contains the liquid electrolyte for a lithium battery according to claim 5.

8. The liquid electrolyte for a lithium battery according to claim 1, wherein a ratio of the glyme relative to a whole solvent is 90 mol % or more.

9. The liquid electrolyte for a lithium battery according to claim 8, wherein the glyme is a tetraglyme.

10. The liquid electrolyte for a lithium battery according to claim 8, wherein the fluoride salt is LiF.

11. A lithium battery comprising a cathode active material layer, an anode active material layer, and an electrolyte layer formed between the cathode active material layer and the anode active material layer, wherein the electrolyte layer contains the liquid electrolyte for a lithium battery according to claim 8.

* * * * *